Patented Dec. 15, 1925.

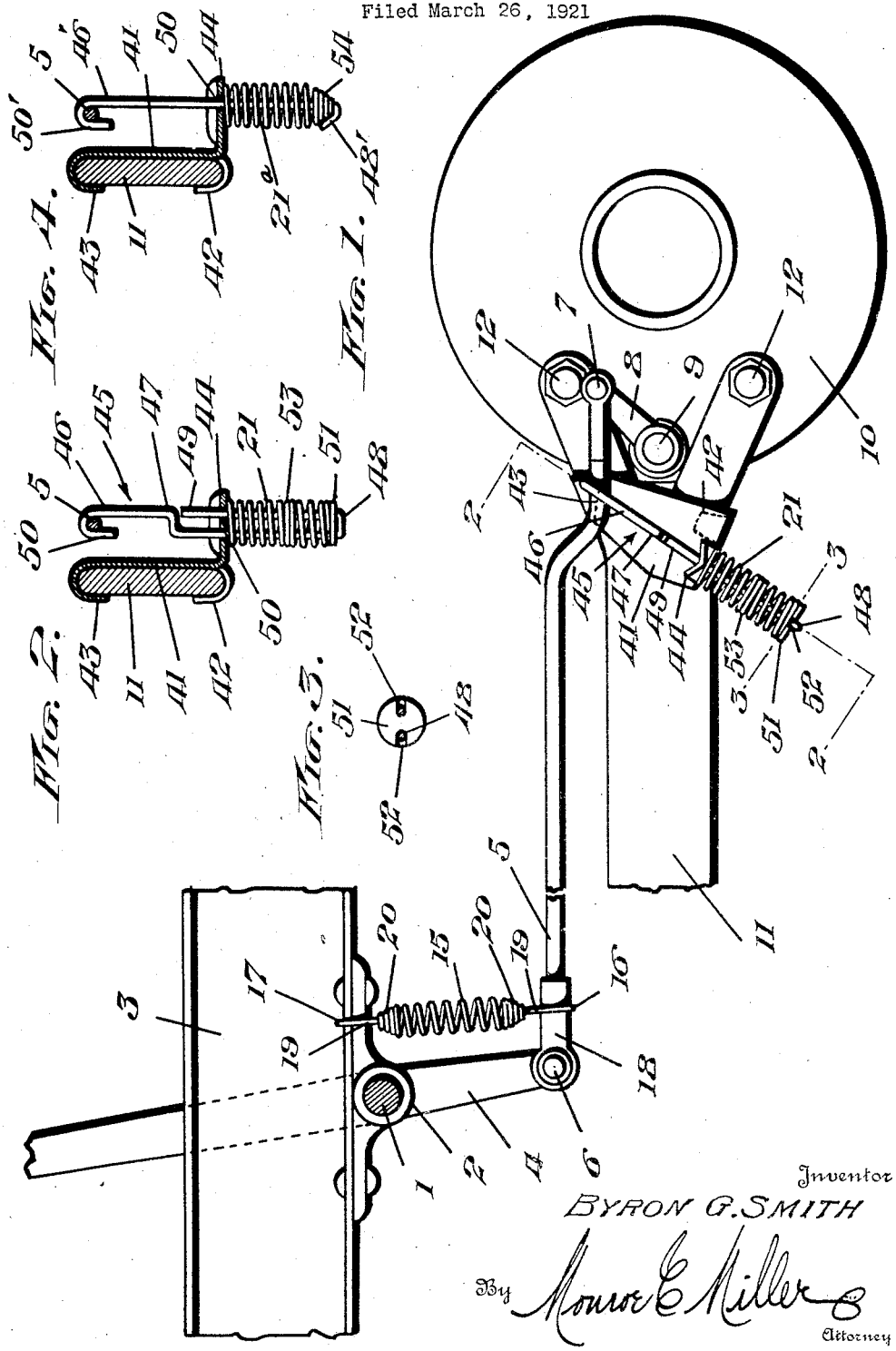

1,565,822

UNITED STATES PATENT OFFICE.

BYRON G. SMITH, OF AVILLA, INDIANA.

ANTIRATTLER.

Application filed March 26, 1921. Serial No. 455,811.

*To all whom it may concern:*

Be it known that I, BYRON G. SMITH, a citizen of the United States, residing at Avilla, in the county of Noble and State of Indiana, have invented certain new and useful Improvements in Antirattlers, of which the following is a specification, reference being had therein to the accompanying drawing.

This invention relates to means for use on a Ford or similar automobile for silencing the usual noise and rattle attendant to loose joints and bearings of the rods and shafts of the brake rigging, and it is the object of the invention to provide simple and inexpensive means of that character which can be quickly and conveniently applied to the machine for holding the joints and shafts of the brake rigging under tension to avoid rattling and noise, and to also take up lost motion in the bearings due to wear.

A further object is the provision of springs, provided with novel means for applying and attaching them to the machine, whereby to effectively silence the usual noise after the parts become worn, and take up the lost motion.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a fragmentary elevation of the brake operating mechanism showing the spring devices applied.

Figs. 2 and 3 are sectional details taken on the lines 2—2 and 3—3, respectively, of Fig. 1.

Fig. 4 is a view similar to Fig. 2 showing a modification.

In Fig. 1 there is shown one of the brake rods and corresponding parts of the brake rigging, which are duplicated at the opposite sides of the machine, as well known, the present spring devices being used at both sides in the same way. The brake mechanism as illustrated, such as used in a Ford automobile, embodies a rock shaft 1 journaled at each side in a bearing 2 secured to the longitudinal side channel 3 of the frame, and a depending arm 4 is secured to the shaft 1 at each side of the machine, and a longitudinal brake rod 5 is connected at its forward end to each arm 4, by means of a pivot 6. The rear end of the rod 5 is connected by a pivot 7 with a cam lever 8 carried by a cam shaft 9 journaled in the flange 10 of the rear brake drum, the forward movement of the rod 5 swinging the lever 8 for applying the brake in the usual manner. The numeral 11 designates the usual radius rod which is secured by means of bolts 12 to the flange 10.

After the machine has been run for some time, the pivots 6 and 7 become loosened, and the wear of the shafts 1 and 9 in their bearings will also result in looseness, whereby the pivots and shafts will rattle and produce objectionable noise, as well as lost motion.

In order to silence the noise and take up the lost motion at the forward end of the brake rod 5, a coiled contractile spring 15 is used, having hooks 16 and 17 at its lower and upper ends. The hook 16 is engaged with the clevis 18 which connects the rod 5 with the pivot 6, and the upper hook 17 is engaged with the lower flange or edge of the channel 3, whereby said spring in being stretched when applied, will raise the forward end of the rod 5 by spring tension, thereby raising the forward end of rod to tighten the pivot between the rod and arm 4, and said arm will also be raised by the spring tension to take up any loose play in the bearing 2 by pressing the shaft 1 against the upper portion of the bearing. In this way, the rattle and noise at the pivot 6 and bearing 2 are silenced, and the lost motion is reduced. The hooks 16 and 17 may be elements separate from the spring 15 so as to be of stouter material, and, as shown, they have shanks 19 around which the terminal convolutions of the spring 15 are tightly wound so as to embrace same, as at 20.

The rear spring tension device embodies a coiled expansion spring 21, which exerts a tension between the brake rod 5 and radius rod 11. A clip 41, which is struck from sheet metal or otherwise formed, bears against and extends across one side of the radius rod 11 or other supporting member, and has a hook 42 at its lower end to engage across the lower edge of the bar 11, and a hook 43 at its upper end to engage across the upper edge of said radius rod. The hooks are sufficiently spaced apart so that when the upper end of the clip 41 is swung forwardly, the hooks can be passed across the upper and lower edges of the rod 11, and the upper end of the clip is then swung rearwardly so that the clip fits snugly rearwardly against the rear bifurcated portion of the radius rod. The lower end of the clip 41 is provided at one side of or forwardly with respect to the hook 42 with an outstanding portion 44 projecting in a direction opposite to the hook 42, so as to extend under the radius rod 5. The upper end of the spring 21 bears upwardly against said portion 44, which serves as a seat for said spring, and said portion 44 is also bent on a longitudinal line into angular cross-section so as to form a downwardly-facing corner or angle serving as a fulcrum for said spring, to permit of the oscillating or rocking motion of the spring as will hereinafter more fully appear.

A member 45 is slidable through the portion 44 to be tensioned by the spring, and to engage the brake rod 5, and said member 45 is composed of the length of wire having the longitudinal portion 46, which is offset between its ends, as at 47, between the portion 44 of the clip and the rod 5, and the lower terminal of the wire is bent back or doubled upon itself to form the lower loop 48, with the terminal 49 extending upwardly to a point adjacent to the offset 47. The upper terminal of the wire is bent back to form a hook 50 at the upper end of the member 45 to engage over the rod 5. The longitudinal portions of the loop 48 are slidable through apertures 50 in the corner or angle of the portion 44, which apertures also permit the member 45 to oscillate in a plane substantially parallel with the radius rod 11 at one side thereof. The member 45 is readily assembled with the clip 41, when the terminal 49 is bent away from the longitudinal portion 46 of said member, so that said terminal 49 can be inserted downwardly through one aperture and then bent back to pass upwardly through the other. The spring 21 surrounds the loop 48 under the portion 44 of the clip, and a disk or seat 51 for the lower end of the spring is carried by the lower end or bend of said loop 48. Thus, when the spring 21 is compressed, the disk can be placed with the loop 48, and said disk has diametrically opposite slots 52 to receive the longitudinal side portions of the loop, whereby the disk can seat on the bend or lower closed end of the loop. The spring 21, when released, will expand and seat at its lower end on the disk 50 and at its upper end against the portion 44, thereby exerting a pressure to slide the member 45 downwardly. The offset 47 serves as a stop to contact with the portion 44 and limit the downward movement of the member 45 when said member is detached from the rod 5. The spring 21 is of helical formation, and several convolutions or coils 53 intermediate the ends of the spring are disposed together in contact with one another, whereby to stiffen or strengthen the spring at the middle portion and prevent the spring from buckling when compressed, and the coils of such spring are spaced apart between such intermediate portion 53 and the terminals.

In applying the spring tension device, the clip 41 is first applied to the radius rod 11 by bringing the lower hook 42 under the lower edge of the rod 11 and then swinging the upper end of the clip 41 forwardly and moving the hook 43 over the upper edge of said rod, after which the upper end of the clip is then swung rearwardly into place, as seen in Fig. 1. The spring 21 is then compressed and the member 45 shoved upwardly so that the hook 50 can engage over the rod 5, and when the member 45 is released, the spring 21 in expanding will pull said member downwardly. The tension thus exerted on the rear terminal of the brake rod 5, will tighten the pivot 7 and also press the shaft 9 down in its bearing, to avoid rattling and other objectionable noise, and to also take up lost motion at both the bearing and pivot. No fastening devices are necessary to hold the clip 41 in place on the radius rod 11 because the spring 21 in pressing upwardly against the portion 44, will hold the hook 42 in engagement with the lower edge of the radius rod, and such spring tension will also tend to swing the clip 41, the upward pressure on the portion 44 creating a rearward pressure on the clip so as to hold the hook 43 snugly against the upper edge of the radius rod. The spring 21 will thus tend to tilt the clip and bind it in place. Furthermore, the member 45 can swing or oscillate when the brake rod 5 is reciprocated, and the upper end of the spring 21 in bearing against the fulcrum corner or edge of the portion 44 can oscillate or rock freely with the member 48. Such rocking motion of the spring will maintain the spring tension or strain practically uniform in all positions of the parts, inasmuch as said member 45 oscillates similarly to the arm or lever 8.

The rear spring tension device is readily applied and removed, and the parts thereof are also readily separated for purpose of repair or replacement. The device is also capable of inexpensive manufacture.

A modified form is shown in Fig. 4 using the same clip 41, but with a single straight wire rod 46' sliding through a single aperture 50 in the portion 44 and having the hook 50' at its upper end to engage over the rod 5, and a hook or bent portion 48' at its lower end on which the lower conical end 54 of the spring 21ª is seated.

Having thus described the invention, what is claimed as new is:—

1. A device of the character described comprising a clip having means adapted to move into engagement with a supporting member so as to attach the clip to said member, and spring means engaging said clip and adapted to engage a member movable relatively to the supporting member, said spring means being so arranged with reference to said means of the clip so that the strain exerted by the spring means on the clip will have a tendency to move said clip on the supporting member in a direction to hold said means of the clip tightly against the supporting member.

2. A device of the character described comprising a clip having means adapted to engage a supporting member by the turning movement of the clip relatively to said member for attaching the clip to said member, and spring means to engage a member movable relatively to the supporting member and engaging said clip, the point of engagement of the spring means and clip being offset with reference to said means of the clip so that the strain exerted by the spring means on the clip has a tendency to turn the clip on the supporting member to hold said means of the clip tightly against the supporting member.

3. A device of the character described comprising a clip to engage a supporting member, a member movable in a portion of the clip for sliding and oscillatory movement relatively to the clip, and a spring between said member and clip, said member being adapted to engage another member movable relatively to the supporting member.

4. A device of the character described comprising a clip having a pair of hooks to engage a supporting member for attaching the clip to said member, and spring means engaging said clip and so arranged with reference to the clip that the strain transmitted by the spring means to the clip will have a tendency to move the clip on the supporting member and thereby hold said hooks tightly against said member.

5. A device of the character described comprising a clip having opposite hooks to engage a supporting member for attaching the clip to said member, said clip having a portion offset relatively to one of said hooks, and spring means engaging said portion and exerting strain to the clip by way of said portion so as to have a tendency to turn the clip on the supporting member and thereby hold the hooks tightly against said member.

6. A device of the character described comprising a clip having opposite hooks to engage a supporting member, said clip having an outstanding portion, a member, slidable through said portion, and a spring to be brought under strain between said member and portion, said portion being so arranged with respect to said hooks in order that the spring, when under strain, will have a tendency to tilt said clip on the supporting member and thereby hold said hooks tightly against the supporting member.

7. A device of the character described comprising a clip having means to engage a supporting member by the tilting movement of said clip relatively to the supporting member for attaching the clip to said member, a slidable member movable in a portion of the clip to engage another part for applying strain thereto, and a spring between said slidable member and clip for exerting strain on the clip by way of said portion, said portion being offset with reference to said means of the clip so that the strain transmitted by the spring to the clip has a tendency to turn the clip on the supporting member to hold said means of the clip tightly against the supporting member.

8. A device of the character described comprising a clip having a bent portion forming a fulcrum corner, a member extending through said portion for sliding and oscillatory movements, and a spring for said member bearing against said corner to oscillate with said member.

9. A device of the character described comprising a clip having an outstanding portion bent to provide a fulcrum corner, a member extending through said portion for sliding and oscillatory movements, and having a portion at one end to engage a reciprocatory member, and an expansion spring between the opposite end of said member and said fulcrum corner to oscillate with said member.

10. A device of the character described comprising a clip, a member slidable through said clip having a loop, a spring to bear against said clip, and a disk adapted to be disposed within said loop and to seat against the bend of the loop to receive the pressure of said spring, said disk having slots to receive the side portions of said loop for retaining the disk in place removably.

In testimony whereof I hereunto affix my signature.

BYRON G. SMITH.